United States Patent
Hayashi

(10) Patent No.: US 9,739,337 B2
(45) Date of Patent: Aug. 22, 2017

(54) VIBRATION DAMPING DEVICE

(71) Applicant: SUMITOMO RIKO COMPANY LIMITED, Komaki-shi, Aichi (JP)

(72) Inventor: Takashi Hayashi, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 59 days.

(21) Appl. No.: 14/885,634

(22) Filed: Oct. 16, 2015

(65) Prior Publication Data
US 2016/0040747 A1 Feb. 11, 2016

Related U.S. Application Data

(63) Continuation of application No. PCT/JP2015/062719, filed on Apr. 27, 2015.

(30) Foreign Application Priority Data

Apr. 30, 2014 (JP) ................. 2014-094218

(51) Int. Cl.
*F16F 15/08* (2006.01)
*B60K 5/12* (2006.01)
(Continued)

(52) U.S. Cl.
CPC ............ *F16F 15/08* (2013.01); *B60K 5/1208* (2013.01); *F16F 1/373* (2013.01); *F16F 3/0873* (2013.01); *F16F 2230/007* (2013.01)

(58) Field of Classification Search
CPC ...... F16F 15/08; F16F 2230/007; F16M 5/00; B60K 5/1208
See application file for complete search history.

(56) References Cited

U.S. PATENT DOCUMENTS

2009/0079116 A1* 3/2009 Yoshii ................. B60K 5/1291
267/140.13
2015/0345583 A1* 12/2015 Ishikawa ............... F16F 3/0873
248/634

FOREIGN PATENT DOCUMENTS

JP 2009-243485 A 10/2009
JP 2012-002328 A 1/2012
(Continued)

OTHER PUBLICATIONS

Nov. 1, 2016 International Preliminary Report on Patentability issued in International Patent Application No. PCT/JP2015/062719.
(Continued)

*Primary Examiner* — Thomas J Williams
(74) *Attorney, Agent, or Firm* — Oliff PLC

(57) ABSTRACT

A vibration damping device including: a first mounting member including a fitting tube part opening to a side for fitting and mounting of an inner bracket; a second mounting member; a main rubber elastic body elastically connecting the first and second mounting members; and a stopper rubber provided on a portion of a circumference of the fitting tube part while projecting to the side from an opening end surface of the fitting tube part, the stopper rubber being configured to overlap the inner bracket. The stopper rubber is configured to be elastically deformed by fitting and mounting of the inner bracket into the fitting tube part so as to abut and overlap the inner bracket in a state urged by an elasticity of the stopper rubber itself.

9 Claims, 5 Drawing Sheets

(51) Int. Cl.
*F16F 3/087* (2006.01)
*F16F 1/373* (2006.01)

(56) References Cited

FOREIGN PATENT DOCUMENTS

| | | |
|---|---|---|
| JP | 4951576 B2 | 6/2012 |
| JP | 2012-207708 A | 10/2012 |
| JP | 2013-117258 A | 6/2013 |
| JP | 2013-117266 A | 6/2013 |

OTHER PUBLICATIONS

Jun. 9, 2015 Search Report issued in International Patent Application No. PCT/JP2015/062719.
Dec. 29, 2016 Office Action issued in Chinese Patent Application No. 201580002278.5.

* cited by examiner

VIBRATION DAMPING DEVICE

INCORPORATED BY REFERENCE

The disclosure of Japanese Patent Application No. 2014-094218 filed on Apr. 30, 2014, including the specification, drawings and abstract is incorporated herein by reference in its entirety. This is a Continuation of International Application No. PCT/JP2015/062719 filed on Apr. 27, 2015.

BACKGROUND OF THE INVENTION

1. Field of the Invention

The present invention relates to a vibration damping device used for an engine mount for an automobile or the like, for example.

2. Description of the Related Art

From the past, known are vibration damping devices interposed between members constituting the vibration transmission system, as one type of vibration damping connecting body or vibration damping support body for vibration damping connecting those members to each other. The vibration damping device has a constitution by which a first mounting member attached to one member constituting the vibration transmission system and a second mounting member attached to another member constituting the vibration transmission system are elastically connected by a main rubber elastic body. Also, as the vibration damping device, as disclosed in Japanese Unexamined Patent Publication No. JP-A-2013-117258, an item has been proposed for which the first mounting member is equipped with a fitting tube part that opens to the side, and an inner bracket is fit and mounted from the side in the fitting tube part.

However, with the constitution noted in JP-A-2013-117258 with which the inner bracket is fit in the fitting tube part, at one portion on the circumference of the fitting tube part, a stopper rubber is provided so as to project to the side from an opening end surface of the fitting tube part. Also, for example, between an inner bracket attached to a first mounting member and an outer bracket attached to a second mounting member, the stopper rubber is inserted, and by abutting of the inner bracket and the outer bracket via the stopper rubber, a bound stopper is constituted that restricts the approaching displacement volume of the first mounting member and the second mounting member.

However, with JP-A-2013-117258, during vibration input, the stopper rubber undergoes elastic deformation in a different phase from the inner bracket, and there was the risk of the stopper rubber striking the inner bracket and a striking noise occurring. Perhaps this is because with JP-A-2013-117258, the stopper rubber extends roughly in parallel or at an incline in relation to the bottom surface of the inner bracket so as to gradually separate as it goes towards the tip end, and overlaps the inner bracket without being adhered. In addition, when the stopper rubber separates from the inner bracket, there was the risk of noise occurring due to separation from the closely abutting state between those overlapping surfaces, or noise occurring due to elastic deformation of the stopper rubber in a state separated from the inner bracket or the like.

SUMMARY OF THE INVENTION

The present invention has been developed in view of the above-described matters as the background, and it is an object of the present invention to provide a vibration damping device with a novel structure which is able to prevent noise due to the stopper rubber striking the inner bracket, noise that occurs when the stopper rubber separates from the inner bracket, and also noise that occurs due to deformation of the stopper rubber in a state separated from the inner bracket or the like.

The above and/or optional objects of this invention may be attained according to at least one of the following modes of the invention. The following modes and/or elements employed in each mode of the invention may be adopted at any possible optional combinations.

Specifically, a first mode of the present invention provides a vibration damping device comprising: a first mounting member including a fitting tube part opening to a side for fitting and mounting of an inner bracket; a second mounting member; a main rubber elastic body elastically connecting the first and second mounting members; and a stopper rubber provided on a portion of a circumference of the fitting tube part while projecting to the side from an opening end surface of the fitting tube part, the stopper rubber being configured to overlap the inner bracket, wherein the stopper rubber is configured to be elastically deformed by fitting and mounting of the inner bracket into the fitting tube part so as to abut and overlap the inner bracket in a state urged by an elasticity of the stopper rubber itself.

With the vibration damping device constituted according to this kind of first mode of the present invention, by the abutting of the inner bracket and the second mounting member side, a stopper means that restricts the relative displacement volume of the first mounting member and the second mounting member is constituted, and damage or the like due to excessive deformation of the main rubber elastic body is prevented. Furthermore, the striking noise during abutment of the inner bracket and the second mounting member side is reduced or eliminated by the buffering action or the like based on internal friction of the stopper rubber.

Also, by the stopper rubber being made to abut and overlap the inner bracket in an urged state, during vibration input, it is easy for the stopper rubber to be held in an abutting state without separating from the inner bracket, and noise due to striking of the stopper rubber on the inner bracket as well as noise generated during the stopper rubber separating from the inner bracket or in a separated state therefrom are prevented. In fact, the stopper rubber is made to elastically deform by mounting of the inner bracket in the first mounting member, and the stopper rubber is urged to the inner bracket side by elasticity of the stopper rubber itself so it is possible to effectively prevent noise with a simple structure without requiring a special urging means or adhesion step or the like.

A second mode of the present invention provides the vibration damping device according to the first mode, wherein an overlapping surface of the stopper rubber to overlap the inner bracket is inclined relative to an overlapping surface of the inner bracket to overlap the stopper rubber.

With the second mode, the inner bracket is mounted on the first mounting member, and by the stopper rubber and the inner bracket being overlapped, the stopper rubber is made to elastically deform following the shape of the inner bracket, and urging force is exhibited based on the elasticity of the stopper rubber. In fact, by using a form for which the overlapping surfaces of the stopper rubber and the inner bracket are relatively inclined, the stopper rubber and the inner bracket are overlapped with a broad surface, and durability is improved by decentralization of the surface pressure with the stopper means.

A third mode of the present invention provides the vibration damping device according to the second mode, wherein the stopper rubber is inclined to an inner circumference side of the fitting tube part as it goes to a projection tip end side of the stopper rubber.

With the third mode, since the stopper rubber inclines to the inner circumference side of the fitting tube part, by fitting and mounting the inner bracket into the fitting tube part, it is possible to easily have the stopper rubber elastically deform. In particular, it is possible to have the overlapping surface of the inner bracket overlapped with the stopper rubber be a roughly parallel surface with the insertion direction to the fitting tube part, and by providing the stopper means in the direction roughly orthogonal to the insertion direction to the fitting tube part, falling out of the inner bracket from the fitting tube is avoided, and a stopper means with excellent load bearing capacity is realized.

A fourth mode of the present invention provides the vibration damping device according to the third mode, wherein an incline angle of an inclined part of the stopper rubber to the inner circumference side of the fitting tube part is fixed.

With the fourth mode, for example a metal mold for forming the stopper rubber and a metal mold for forming a covering rubber for covering the fitting tube part or the like are integrally made, and even in a case when mold division is done so that demolding is done in the fitting tube part opening direction, by having the incline angle of the inclined part of the stopper rubber be roughly fixed, it is possible to relatively easily take the stopper rubber having an undercut structure in relation to the demolding direction out from the metal mold.

A fifth mode of the present invention provides the vibration damping device according to the third mode, wherein an incline angle of an inclined part of the stopper rubber to the inner circumference side of the fitting tube part becomes larger as it goes to the projection tip end side.

With the fifth mode, by having the stopper rubber overlap the inner bracket, even if the overlapping surface of the inner bracket to overlap the stopper rubber is a flat surface that is not inclined, it is possible to obtain urging force not only with the elasticity of the base end part of the stopper rubber but also by the elasticity of the projection tip end side. Therefore, it is easier to hold the projection tip end side of the stopper rubber, which easily separates from the inner bracket during vibration input, in a state abutting the inner bracket, so it is possible to effectively prevent noise due to the stopper rubber striking the inner bracket, noise that occurs when the stopper rubber separates from the inner bracket, and noise that occurs in a separated state or the like.

A sixth mode of the present invention provides the vibration damping device according to any one of the first to fifth modes, wherein the stopper rubber has a plate shape that extends in a circumference direction of the fitting tube part.

With the sixth mode, the overlapping surfaces of the stopper rubber and the inner bracket can be ensured to be large in the circumference direction of the fitting tube part, and durability is improved by decentralization of the surface pressure with the stopper means.

A seventh mode of the present invention provides the vibration damping device according to any one of the first to sixth modes, wherein the stopper rubber includes support recesses formed on both widthwise end parts of its projection base end part while opening to an outer circumference side of the fitting tube part, and the fitting tube part is exposed to the outer circumference side at the support recesses.

With the seventh mode, support recesses that expose the fitting tube part are formed at both ends in the width direction, so while making fewer locations that are thin walled at the projection base end part of the stopper rubber, when doing vulcanization molding of the main rubber elastic body, it is possible to support the fitting tube part with the metal mold at the support recess formed part. Therefore, it is possible to have the urging force by the elasticity of the base end part of the stopper rubber be sufficiently large, and possible to stably support the fitting tube part with good balance at both ends in the width direction during molding of the rubber elastic body.

An eighth mode of the present invention provides the vibration damping device according to any one of the first to seventh modes, wherein the fitting tube part is covered by a covering rubber including an end surface covering part that covers an axially end surface of the fitting tube part, the stopper rubber is integrally formed with the end surface covering part and projects axially outward therefrom, an overlapping surface of the stopper rubber to overlap the inner bracket includes a base end edge, the base end edge being positioned on the axially end surface of the fitting tube part, the end surface covering part further to the inner circumference side than the base end edge includes an inclined end surface inclined axially inward facing the inner circumference side, and the inclined end surface is configured to be pressed by the inner bracket in a fitting direction.

With the eighth mode, the fitting end is reliably regulated by the inner bracket fit into the fitting tube part abutting on the fitting tube part via the end surface covering part of the covering rubber. Also, the base end edge of the stopper rubber that becomes the outer circumference edge part of the inclined end surface is positioned further to the inner circumference side than the outer circumference surface of the fitting tube part, so by elastic deformation of the end surface covering part in accordance with abutting of the inner bracket, force is applied on the stopper rubber in the direction pressing to the inner bracket side. By so doing, noise due to striking of the stopper rubber on the inner bracket, noise that occurs when the stopper rubber separates from the inner bracket, and noise that occurs in a separated state and the like are more effectively prevented. In fact, since the abutting surface of the end surface covering part to abut the inner bracket is the inclined end surface, localized stress concentration that comes with abutting of the inner bracket on the end covering part is ameliorated, and also, it is possible to have even more efficient pressing force of the stopper rubber to the inner bracket side by elastic deformation of the end surface covering part.

A ninth mode of the present invention provides the vibration damping device according to any one of the first to eighth modes, wherein the stopper rubber is integrally formed with the main rubber elastic body, the stopper rubber includes a deformation allowance groove formed at its projection base end part, the deformation allowance groove extending in a width direction while opening onto a surface reverse to an overlapping surface to overlap the inner bracket, a groove internal surface of the deformation allowance groove has a smooth curved shape in a groove width direction, and an opening part of the deformation allowance groove is smoothly continuous with each surface of the stopper rubber and the main rubber elastic body.

With the ninth mode, by having the stopper rubber and the main rubber elastic body integrally formed, it is possible to easily have a constitution with a small number of components. Furthermore, with the deformation allowance groove formed on the base end part of the stopper rubber, a large free surface of the base end part of the stopper rubber is ensured, and in relation to elastic deformation of the stopper rubber due to mounting of the inner bracket and the like, it is possible to reduce tensile stress that acts on the base end part of the stopper rubber and improve durability.

A tenth mode of the present invention provides the vibration damping device according to any one of the first to ninth modes, wherein the first mounting member is arranged at one opening side of the second mounting member having a tube shape, and a bound stopper is constituted that restricts relative approaching displacement volume of the first mounting member and the second mounting member by abutting of the inner bracket fit in the fitting tube part of the first mounting member and a second mounting member side via the stopper rubber.

With the tenth mode, the bound stopper is constituted with a simple constitution, and it is possible to prevent damage or the like of the main rubber elastic body due to excessive approaching displacement of the first mounting member and the second mounting member. In fact, the striking noise during abutment of the inner bracket and the second mounting member side is reduced by the stopper rubber overlapped with the inner bracket in an urged abutting state, and noise due to striking of the stopper rubber on the inner bracket, noise that occurs when the stopper rubber separates from the inner bracket, and noise that occurs in a separated state and the like are prevented as well.

With the present invention, by fitting and mounting the inner bracket into the fitting tube part of the first mounting member, the stopper rubber is elastically deformed, and the stopper rubber is made to overlap the inner bracket in an urged abutting state. By so doing, during vibration input, it is easier to hold the stopper rubber in an abutting state without separating from the inner bracket, and the occurrence of noise due to striking of the stopper rubber on the inner bracket, noise when separating from the inner bracket or when in a separated state or the like are prevented. Furthermore, since the stopper rubber is urged to the inner bracket side by the elasticity of the stopper rubber itself, it is possible to prevent the occurrence of noise with a simple constitution without requiring a special urging means, adhesion or the like to urge the stopper rubber.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
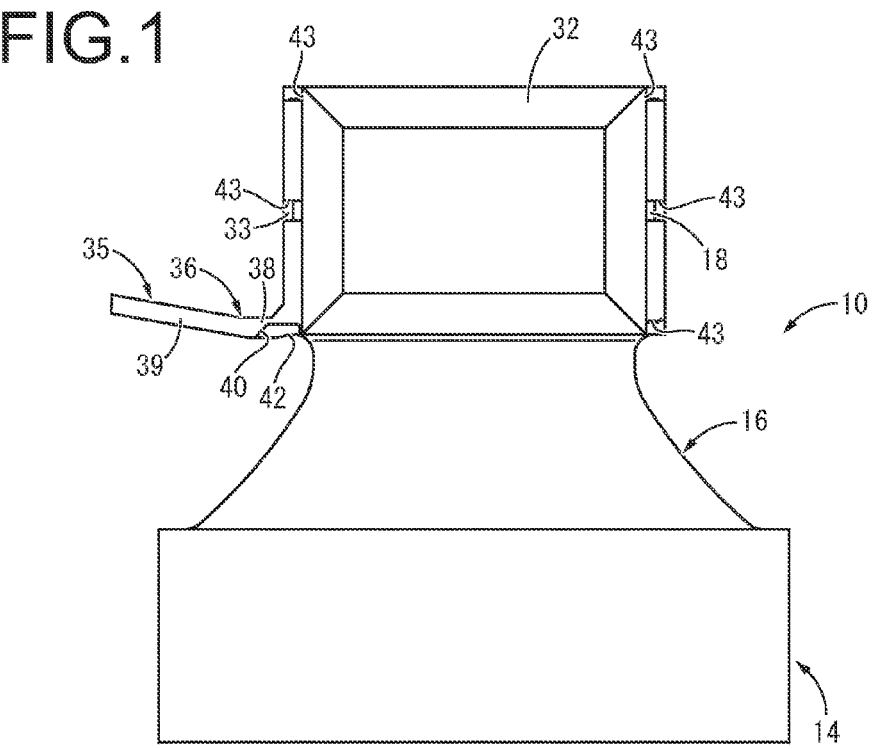
FIG. 1 is a front view showing a vibration damping device in the form of an engine mount as a first embodiment of the present invention.
Figure 2:
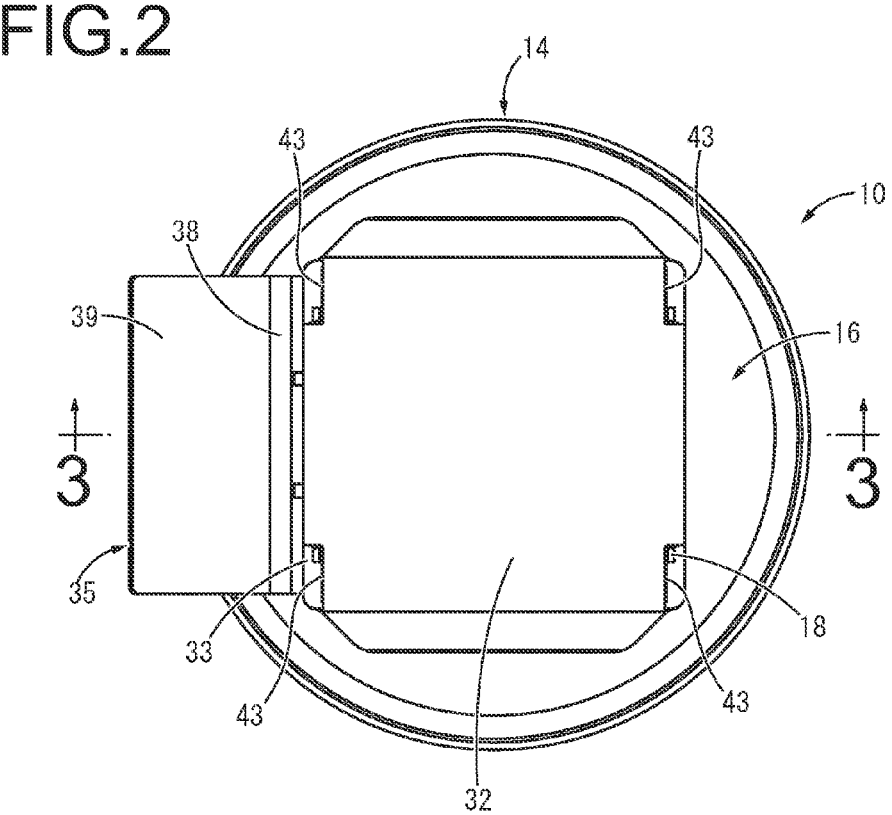
FIG. 2 is a plan view of the engine mount shown in FIG. 1.

Following, we will describe embodiments of the present invention while referring to the drawings.

FIGS. 1 to 4 show an engine mount 10 of an automobile as a first embodiment of a vibration damping device constituted according to the present invention. The engine mount 10 has a constitution with which a first mounting member 12 and a second mounting member 14 are elastically connected by a main rubber elastic body 16. With the description below, as a rule, the vertical direction means the vertical direction in FIG. 1 which is the mount center axis direction.

Figure 3:
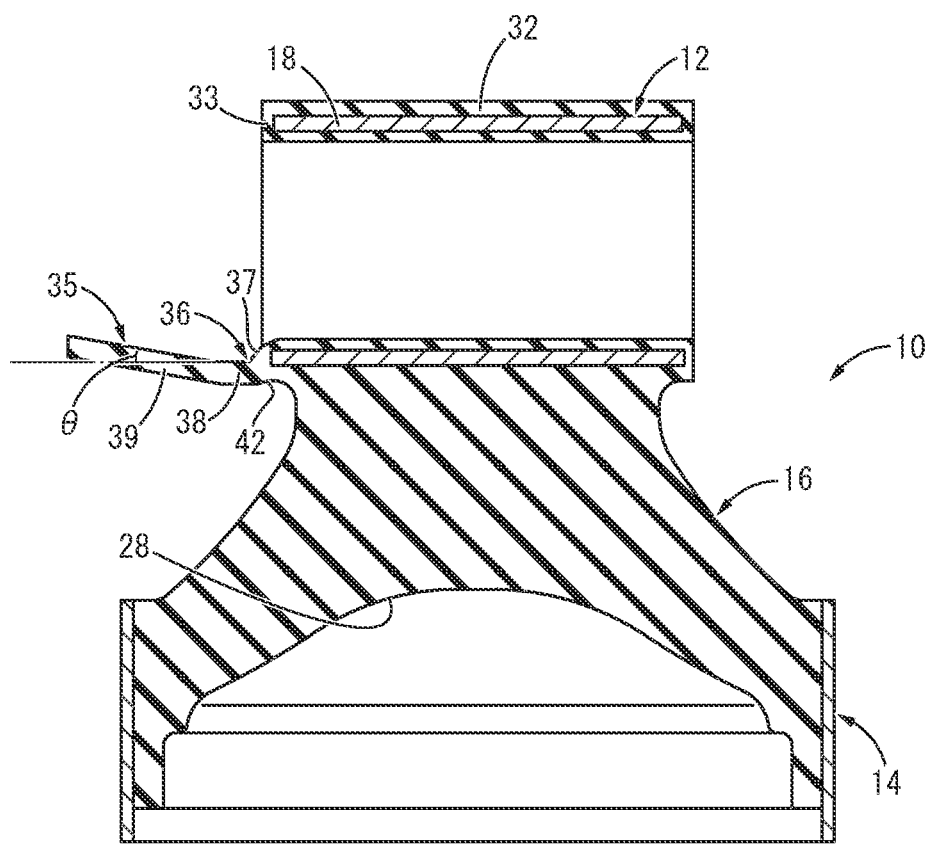
FIG. 3 is a cross section view taken along line 3-3 of FIG. 2.

In more specific detail, the first mounting member 12 is a highly rigid member formed using iron, an aluminum alloy or the like, and as shown in FIG. 3, is equipped with a roughly rectangular tube shaped fitting tube part 18 that opens to the side extending in the direction roughly orthogonal to the mount center axis. On the other hand, the second mounting member 14 is a highly rigid member similar to the first mounting member 12, and has a thin walled, large diameter, roughly round tube shape extending vertically.

Then, the first mounting member 12 is arranged at the upper opening side of the second mounting member 14, and the first mounting member 12 and the second mounting member 14 are elastically connected by the main rubber elastic body 16. The main rubber elastic body 16 has a thick walled, large diameter, roughly truncated cone shape, with the small diameter side end part adhered by vulcanization to the first mounting member 12, and the outer circumference surface of the large diameter side end part adhered by vulcanization to the second mounting member 14.

Furthermore, a large diameter recess 28 is formed on the main rubber elastic body 16. The large diameter recess 28 has roughly an inverted mortar shape gradually becoming larger in diameter facing downward, which is the opening side, and opens to the end surface of the large diameter side of the main rubber elastic body 16.

Furthermore, the fitting tube part 18 of the first mounting member 12 is covered by a covering rubber 32. The covering rubber 32 is a rubber layer that covers across roughly the entirety of the surface of the fitting tube part 18, and is integrally formed with the main rubber elastic body 16. The opening end surface of the fitting tube part 18 is covered by an end surface covering part 33 of the covering rubber 32. Also, the covering rubber 32 that covers the inner circumference surface of the fitting tube part 18 becomes gradually thinner toward the openings of both sides from the center of the length direction of the fitting tube part 18, and the inner circumference surface of the covering rubber 32 is constituted with a tapered surface that gradually expands facing the opening of the fitting tube part 18.

Also, a stopper rubber 35 is integrally formed with the main rubber elastic body 16 and the end surface covering part 33 of the covering rubber 32. The stopper rubber 35 has a designated width in the circumference direction (in FIG. 2, the vertical direction) at the lower wall part of the fitting tube part 18, and is a plate shaped rubber elastic body that extends at a roughly fixed thickness dimension, and projects axially outward from one end surface covering part 33 of the fitting tube part 18.

Furthermore, with this embodiment, a base end edge 36 of the top surface of the stopper rubber 35 is positioned below the top surface of the covering rubber 32 that covers the lower wall part inner circumference surface of the fitting tube part 18. Besides, the base end edge 36 of the stopper rubber 35 and the top surface of the covering rubber 32 that covers the lower wall part inner circumference surface of the fitting tube part 18 are connected by an inclined end surface 37 inclined downward to the outer circumference side of the fitting tube part 18 gradually as it goes toward the projection tip end side of the stopper rubber 35. Also, the end edge of the stopper rubber 35 side at the inclined end surface 37 is positioned on the axially end surface of the fitting tube part 18, and overlaps the lower wall part of the fitting tube part 18 when viewed in the fitting direction projection of an inner bracket 44 described later. Thus, the inclined end surface 37 is provided further to the inner circumference side than the outer circumference surface of the fitting tube part 18. In other words, with this embodiment, the end surface covering part 33 of the covering rubber 32 positioned further to the inner circumference side than the base end edge 36 of the stopper rubber 35 has the surface on axially outside of the fitting tube part 18 as the inclined end surface 37 that is inclined axially inward facing the inner circumference side. The inclined end surface 37 is connected smoothly and continuously to the top surface of the covering rubber 32 that covers the lower wall part inner circumference surface of the fitting tube part 18, and is connected to the top surface of the stopper rubber 35 in a polygonal line extending in the width direction (vertical direction in FIG. 2).

Here, as shown in FIG. 3, with the stopper rubber 35, a base end plate part 38 extends in the direction roughly orthogonal to the mount center axis, while a tip end plate part 39 is used as the inclined part that is inclined to the inner circumference side of the fitting tube part 18 as it goes toward the projection tip end side. With this embodiment, the stopper rubber 35 is provided so as to project to the side from the lower wall part of the fitting tube part 18, and the tip end plate part 39 is inclined upward at a roughly fixed incline angle (θ) facing the projection tip end side. Furthermore, with this embodiment, the tip end plate part 39 of the stopper rubber 35 is a roughly flat plate shape with a roughly fixed thickness dimension, and the top surface and bottom surface are inclined surfaces that are both mutually inclined at roughly the same angle, and the elastic major axis of the projection direction of the tip end plate part 39 gradually inclines upward as it goes to the projection tip end side. Furthermore, with the stopper rubber 35, the projection tip end part is formed at a length projecting further to the outer circumference side than the second mounting member 14. The size of the incline angle (θ) of the tip end plate part 39 with the stopper rubber 35 is not particularly limited, and can be set as appropriate considering the shape of the lower surface of the inner bracket 44 described later, the mold removability of the stopper rubber 35 and the like.

Figure 4:
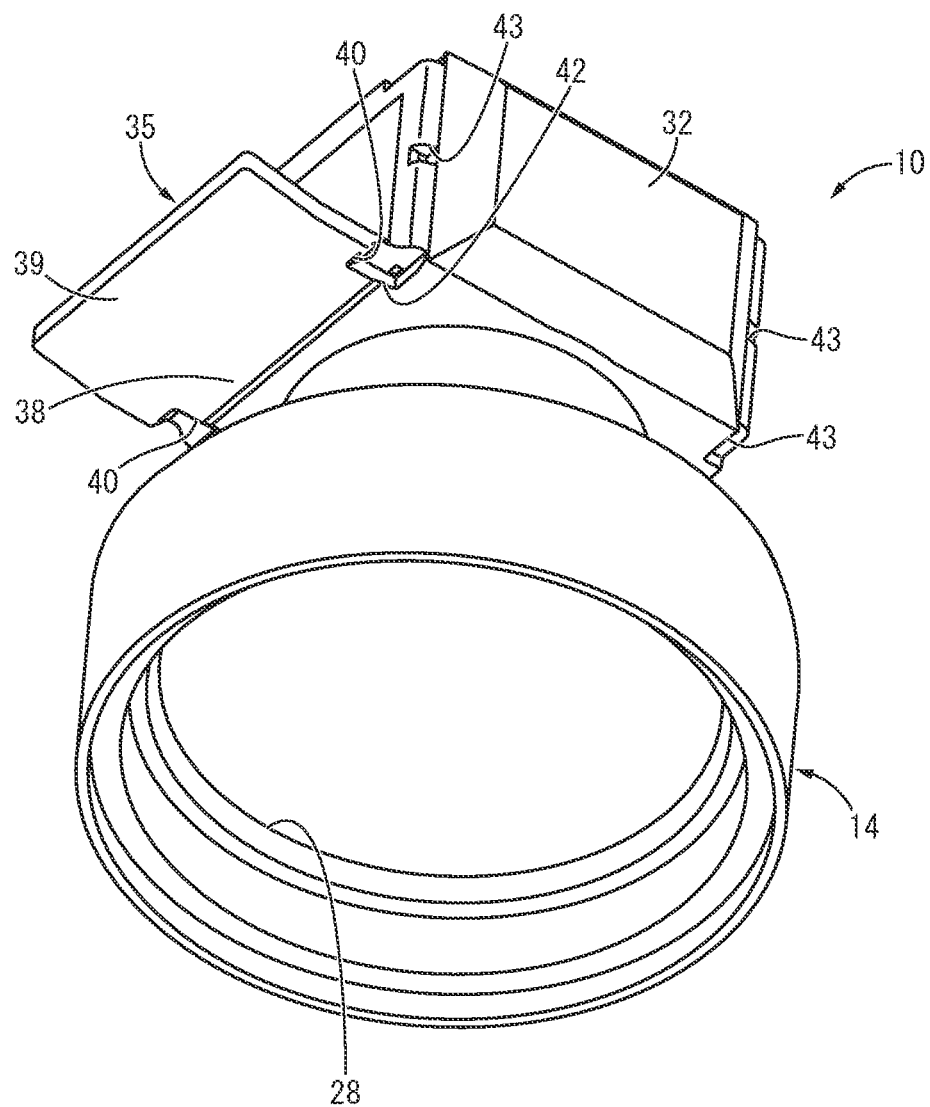
FIG. 4 is a perspective view of the engine mount shown in FIG. 1.

Furthermore, a pair of support recesses 40, 40 opening at the bottom surface is formed on the base end plate part 38 of the stopper rubber 35 and the covering rubber 32 connected thereto. As shown in FIGS. 1 and 4, the support recesses 40 are formed at both widthwise end parts of the stopper rubber 35, and open at the stopper rubber 35 bottom surface and widthwise outer surface. Also, at the parts at which the support recesses 40 are formed, portions of the fitting tube part 18 are exposed from the covering rubber 32.

Furthermore, a deformation allowance groove 42 is formed on the projection base end part positioned at the base end plate part 38 side of the stopper rubber 35. The deformation allowance groove 42 opens to the bottom surface of the base end plate part 38 that is the outer circumference side of the fitting tube part 18, extends continuously across the entire length in the width direction of the base end plate part 38, and with this embodiment, both end parts are connected to the pair of support recesses 40, 40. Furthermore, the deformation allowance groove 42 extends in a roughly fixed groove cross section shape, and the groove internal surface has a smooth, curved shape that does not have any break points in the groove width direction, and the opening part is smoothly connected to the bottom surface of the stopper rubber 35 and the bottom surface of the covering rubber 32. The bottom surface of the covering rubber 32 is smoothly connected continuously to the outer circumference surface of the main rubber elastic body 16.

The main rubber elastic body 16, the covering rubber 32, and the stopper rubber 35 are formed as an integrally vulcanization molded component incorporating the first mounting member 12 and the second mounting member 14. Specifically, by a cavity of a metal mold (not illustrated) in which the first mounting member 12 and the second mounting member 14 are set being filled with rubber material and undergoing vulcanization molding, the main rubber elastic body 16 equipped with the covering rubber 32 and the stopper rubber 35 is formed. With this embodiment, since the rubber elastic body is vulcanization molded in a state with the fitting tube part 18 supported by the metal mold at a plurality of locations of the opening end part, the fitting tube part 18 is exposed to the outside at the pair of support recesses 40, 40 and a plurality of notches 43 formed on the covering rubber 32. With the fitting tube part 18, both widthwise end parts of the top surface and the bottom surface, and the opening end surface and the widthwise outer surface of the vertical center part are exposed to the outside through the pair of support recesses 40, 40 and the plurality of notches 43.

Figure 5:
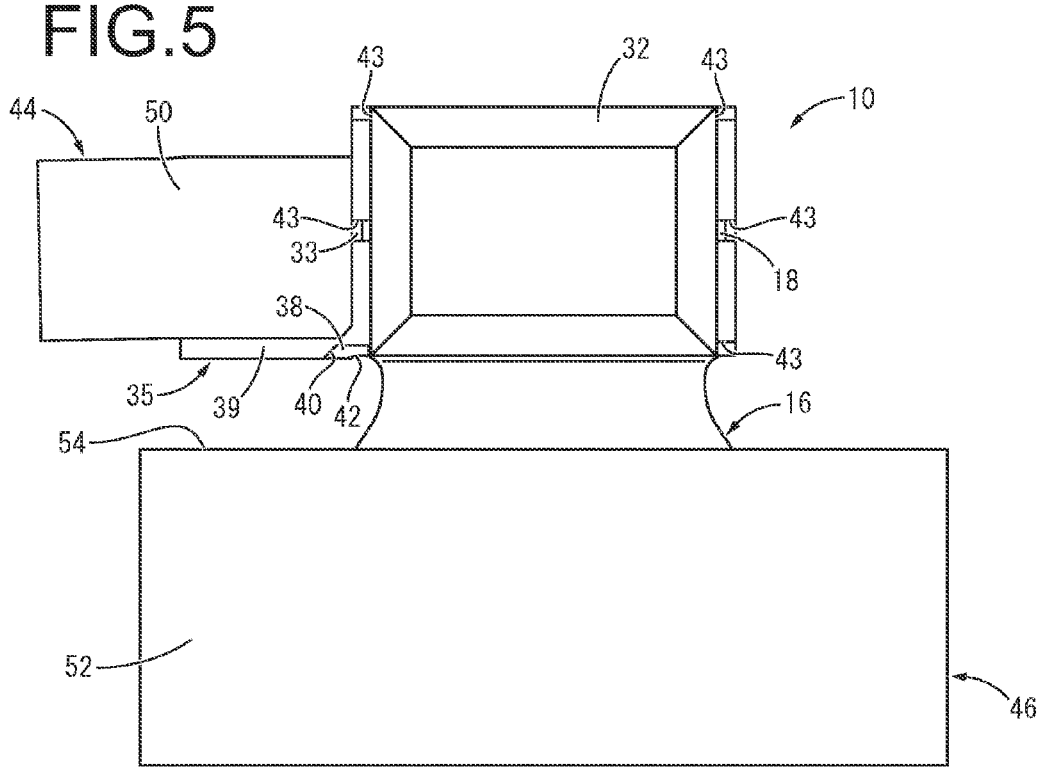
FIG. 5 is a front view with an inner bracket and an outer bracket mounted on the engine mount shown in FIG. 1.
Figure 6:
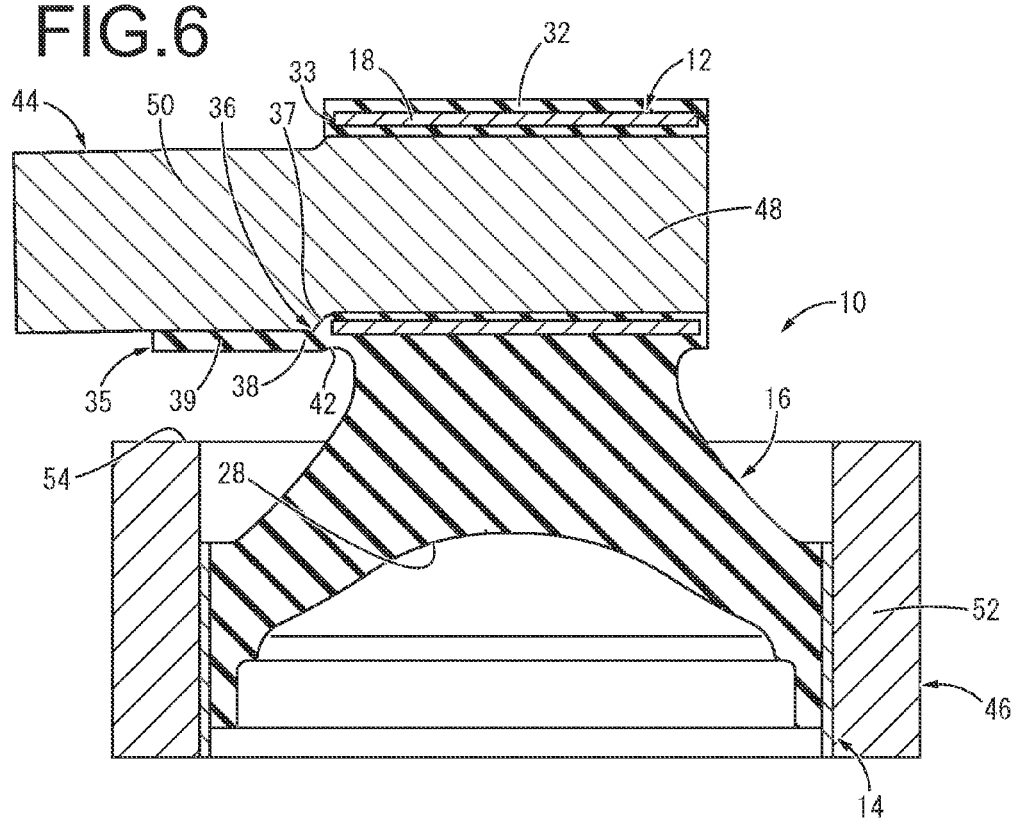
FIG. 6 is a vertical cross section view of the engine mount with the brackets shown in FIG. 5.

As shown in FIGS. 5 and 6, the inner bracket 44 and an outer bracket 46 are mounted on the engine mount 10 constituted as described above. Specifically, the inner bracket 44 is a highly rigid member formed of iron, an aluminum alloy or the like, and is integrally equipped with a roughly rectangular rod shaped fitting part 48 that is press fit and fixed to the fitting tube part 18 of the first mounting member 12 and an attachment part 50 projecting to the side from the fitting part 48. A bolt hole (not illustrated) is formed at the end part on the side opposite to the fitting part 48 with the attachment part 50. Also, the bottom surface of the attachment part 50 is a flat surface that extends orthogonally to the mount center axis, and is inclined relative to the top surface of the stopper rubber 35. Furthermore, the bottom surface of the attachment part 50 projects further downward than the bottom surface of the fitting part 48, and in a state with the fitting part 48 press fit mounted on the fitting tube part 18, is positioned at roughly the same vertical position as the base end edge 36 of the stopper rubber 35.

The outer bracket 46 is a highly rigid member, the same as the inner bracket 44, and has a press fit tube part 52 having a roughly round tubular shape. Furthermore, the press fit tube part 52 is thick walled with a large diameter, and a portion on the circumference of the top end surface is used as a stopper abutting surface 54 facing opposite vertically to the inner bracket 44 in a vehicle mounted state described later. Though not shown explicitly in the drawings, an attachment part to the vehicle body described later is fixed as an integrated unit or a separate unit to the press fit tube part 52 on the outer bracket 46.

Also, by the fitting part 48 of the inner bracket 44 being fit in the fitting tube part 18 of the first mounting member 12, and the second mounting member 14 being press fit to the press fit tube part 52 of the outer bracket 46, the inner bracket 44 and the outer bracket 46 are attached to the engine mount 10. Furthermore, by the attachment part 50 of the inner bracket 44 being fixed to a power unit (not illustrated) and the outer bracket 46 being fixed to a vehicle body (not illustrated), the engine mount 10 is interposed between the power unit and the vehicle body, and the power unit is given vibration damping support by the vehicle body. By the lower part of the attachment part 50 with the inner bracket 44 abutting the axially end surface of the fitting tube part 18 via the end surface covering part 33 of the covering rubber 32, the fitting end is regulated. Also, in the state mounted on the vehicle, since the static burden support load of the power unit is input in the axial direction between the first mounting member 12 and the second mounting member 14, the first mounting member 12 and the second mounting member 14 are displaced relatively approaching in the axial direction.

Also, the bottom surface of the attachment part 50 of the inner bracket 44 and the stopper abutting surface 54 of the outer bracket 46 are arranged facing opposite separated by a designated distance vertically, and the stopper rubber 35 is inserted between the facing surfaces of the inner bracket 44 and the outer bracket 46. When the first mounting member 12 and the second mounting member 14 are relatively displaced significantly in the approaching direction by vibration input in the axial direction, the attachment part 50 of the inner bracket 44 and the outer bracket 46 abut via the stopper rubber 35. By so doing, a bound stopper that restricts the relative displacement volume of the first mounting member 12 and the second mounting member 14 is constituted, and since excessive approaching displacement by the first mounting member 12 and the second mounting member 14 is prevented, damage to the main rubber elastic body 16 and the like is avoided.

In fact, by the inner bracket 44 and the outer bracket 46 abutting via the stopper rubber 35, the striking noise during abutting is reduced or prevented. In addition, since the stopper rubber 35 is a plate shape having a designated width in the circumference direction of the fitting tube part 18, the stopper rubber 35 is inserted between the inner bracket 44 and the outer bracket 46 across a broad range in the circumference direction of the outer bracket 46. Thus, by decentralization of the surface pressure, durability of the stopper rubber 35 is improved. With this embodiment, as shown in FIG. 6, the widthwise center part of the stopper rubber 35 has a length that does not reach to the outer circumference end of the outer bracket 46, but the stopper rubber 35 can extend out to the outer circumference further than the outer bracket 46 across the entire width direction.

Furthermore, the bottom surface of the attachment part 50 with the inner bracket 44 extends roughly orthogonally to the mount center axis in roughly the same vertical position as the top surface of the base end plate part 38 with the stopper rubber 35 in a state with the inner bracket 44 mounted on the first mounting member 12. Therefore, the bottom surface of the attachment part 50 is pressed against the top surface of the tip end plate part 39 that tilts upward facing the projection tip end side. By so doing, as shown in FIGS. 5 and 6, the stopper rubber 35 is pressed down on the tip end side by the inner bracket 44, and in a state elastically deformed in a non-inclined shape extending in the direction roughly orthogonal to the mount center axis, is overlapped with the attachment part 50 of the inner bracket 44. As a result, the stopper rubber 35 abuts and overlaps the attachment part 50 of the inner bracket 44 in a state urged by its own elastic force. The deformation allowance groove 42 formed on the base end plate part 38 of the stopper rubber 35 opens onto the surface reverse to the overlapping surface of the stopper rubber 35 to overlap the inner bracket 44. Also, the relative incline angle (θ) of the top surface of the tip end plate part 39 of the stopper rubber 35 and the bottom surface of the attachment part 50 of the inner bracket 44 is preferably set so as to be 3°≤θ≤20°, and more preferably 5°≤θ≤15°. By so doing, while preventing the stopper rubber 35 from being a marked obstacle during fitting and mounting of the inner bracket 44 into the fitting tube part 18, it is possible to obtain sufficient urging force of the stopper rubber 35 to the inner bracket 44 side.

In this way, by having the stopper rubber 35 abut and overlap the inner bracket 44 in an urged state, it is easier to hold the stopper rubber 35 in an abutting state to the inner bracket 44 even during vibration input, and it is possible to prevent striking of the stopper rubber 35 after separation from the inner bracket 44. With this embodiment, since the tip end plate part 39 of the stopper rubber 35 is an inclined plate shape that inclines to the inner circumference side of the fitting tube part 18 as it goes to the projection tip end side, by the inner bracket 44 being mounted, the entire stopper rubber 35 overlaps the inner bracket 44 with almost no gap therebetween, so the occurrence of a striking noise is more effectively prevented. Also, by the stopper rubber 35 being held in a state abutting the inner bracket 44, when the stopper rubber 35 separates from the inner bracket 44, the noise that occurs due to separation from the tightly abutting state of those overlapping surfaces, and the noise that occurs when the stopper rubber deforms in a state separated from the inner bracket 44 and the like are effectively prevented.

In fact, with this embodiment, the inclined end surface 37 that connects the top surface of the stopper rubber 35 and the inner circumference surface of the covering rubber 32 is an inclined surface that inclines in relation to the fitting direction of the inner bracket 44, and is provided further to the inner circumference side than the outer circumference surface of the fitting tube part 18. Then, by mounting of the inner bracket 44 to the fitting tube part 18, the attachment part 50 of the inner bracket 44 is configured to be pressed against the inclined end surface 37 in the fitting direction. By so doing, the stopper rubber 35 is more strongly pressed against the attachment part 50 of the inner bracket 44 by the elastic deformation of the end surface covering part 33 that comes with abutting of the inner bracket 44 on the inclined end surface 37. Thus, it is possible to more effectively reduce noise due to striking of the stopper rubber 35 on the inner bracket 44, noise that occurs when separating from the inner bracket 44, and noise that occurs when in a separated state from the inner bracket 44. In addition, by the abutting surface with the inner bracket 44 of the end surface covering part 33 being inclined in relation to the fitting direction of the inner bracket 44, local concentration of stress that comes with abutting is prevented, and durability is improved and the like.

Furthermore, the urge of the stopper rubber 35 to the inner bracket 44 side is realized by the elasticity of the stopper rubber 35 itself simply by mounting of the inner bracket 44 to the first mounting member 12, so a special urging means, adhesion or the like are not required, and an increase in the number of components, the number of manufacturing steps and the like are avoided. In fact, by the tip end plate part 39 of the stopper rubber 35 being a roughly flat plate shape, when the metal mold for forming the stopper rubber 35 has the mold division in the fitting tube part 18 opening direction (the lateral direction in FIG. 3), it is possible to relatively easily remove the metal mold from the stopper rubber 35 which has an undercut structure, and it is possible to do vulcanization molding of the main rubber elastic body 16 equipped with the stopper rubber 35 having a low number of mold divisions.

Also, with this embodiment, support recesses 40 are formed at both widthwise end parts of the base end plate part 38 of the stopper rubber 35, and during molding of the covering rubber 32 and the stopper rubber 35, at the parts at which the support recesses 40 are formed at which the fitting tube part 18 is exposed to the outside, the first mounting member 12 is supported by the metal mold. By so doing, with the base end plate part 38 of the stopper rubber 35, the thin walled part for supporting the fitting tube part 18 with the metal mold is kept to a minimum, and it is possible to effectively obtain urging force to the inner bracket 44 side by the elasticity of the stopper rubber 35, and during molding of the covering rubber 32 and the stopper rubber 35, it is possible to stably and with good balance support both widthwise end parts of the fitting tube part 18 with the metal mold.

Also, the deformation allowance groove 42 opens at the bottom surface of the base end plate part 38 of the stopper rubber 35, and the free surface of the base end plate part 38 is made larger. Therefore, stress that acts on the base end plate part 38 in an elastically deformed state of the stopper rubber 35 due to mounting of the inner bracket 44 is reduced, and durability of the base end plate part 38 is improved.

With this embodiment, the base end plate part 38 that extends roughly orthogonally to the mount center axis is provided at the base end part of the stopper rubber 35, but the entire stopper rubber can also be inclined in relation to the direction orthogonal to the mount center axis.

Figure 7:
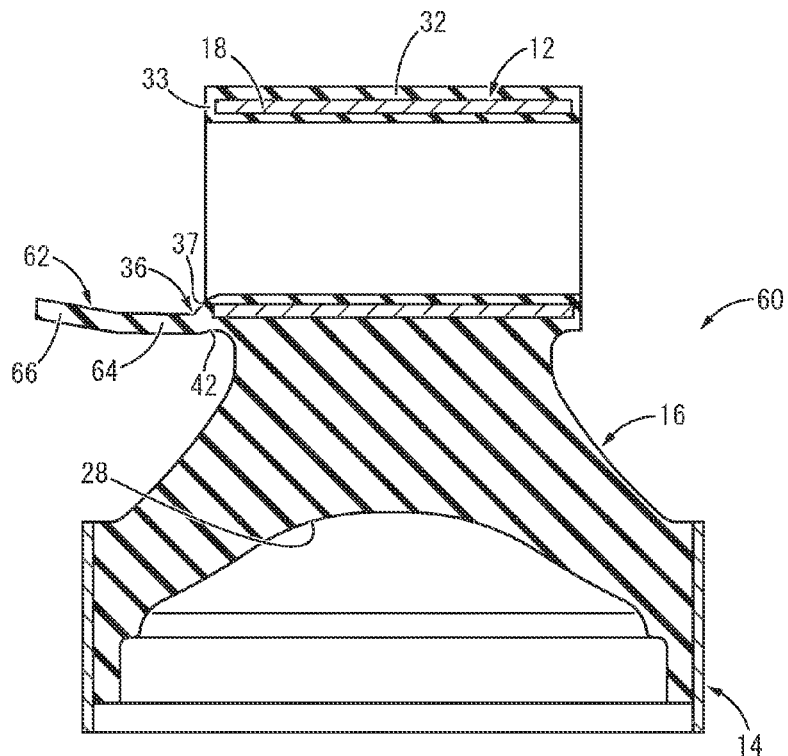
FIG. 7 is a vertical cross section view showing an engine mount as a second embodiment of the present invention.

FIG. 7 shows an engine mount 60 for an automobile as a second embodiment of the vibration damping device constituted according to the present invention. The engine mount 60 is equipped with a stopper rubber 62. With the description hereafter, members and parts that are substantially the same as those of the first embodiment will be given the same code numbers in the drawings, and a description will be omitted. Also, the parts not explicitly shown in the drawing for the engine mount 60 (pair of support recesses 40, 40, plurality of notches 43 of the covering rubber 32 and the like), and the inner bracket 44 and outer bracket 46 to be attached to the engine mount 60 can use the same constitution as those of the first embodiment.

In more specific detail, the stopper rubber 62 has a plate shape that projects from the opening end part of the fitting tube part 18 with roughly fixed width dimensions. The stopper rubber 62 is integrally equipped with a base end plate part 64 with a small incline angle in relation to the direction orthogonal to the mount center axis and a tip end plate part 66 with a large incline angle, and is in a form a bent in the thickness direction at the projection direction center part. In other words, the stopper rubber 62 is an inclined part for which the entirety is inclined in relation to the direction orthogonal to the mount center axis, the incline angle changes in two stages in the projecting direction, and the incline angle of the projection tip end part is larger than that of the base end part. The base end plate part 64 and the tip end plate part 66 of this embodiment have mutually roughly the same thickness, and each has roughly a fixed thickness, so the top surface and bottom surface are inclined at roughly the same angle.

With the engine mount 60 having this kind of constitution as well, the same as with the first embodiment, the inner bracket 44 is attached to the first mounting member 12, and the outer bracket 46 is attached to the second mounting member 14. Then, in the state with the inner bracket 44 mounted to the first mounting member 12, the attachment part 50 of the inner bracket 44 is pressed against the stopper rubber 62, and the stopper rubber 62 is elastically deformed in a roughly flat plate shape without an incline that extends roughly orthogonally to the mount center axis. By so doing, the stopper rubber 62 is abutted on the inner bracket 44 in a state urged by its own elasticity, and the occurrence of noise such as by striking of the stopper rubber 62 on the inner bracket 44 or the like is prevented.

With this embodiment, the incline angle of the stopper rubber 62 changes in stages in the projection direction, and the incline angle of the tip end plate part 66 is made larger than that of the base end plate part 64. By so doing, by mounting of the inner bracket 44 to the first mounting member 12, urging force is applied by the elasticity of the base end part of the stopper rubber 62, and urging force is also exhibited by the elasticity of the boundary part of the base end plate part 64 and the tip end plate part 66 with the stopper rubber 62. Therefore, at the tip end side of the stopper rubber 62 that is easily separated from the inner bracket 44, it is possible to effectively obtain urging force based on the elasticity of the stopper rubber 62, and by making it even easier to hold the abutting state on the inner bracket 44, noise is advantageously prevented.

Figure 8:
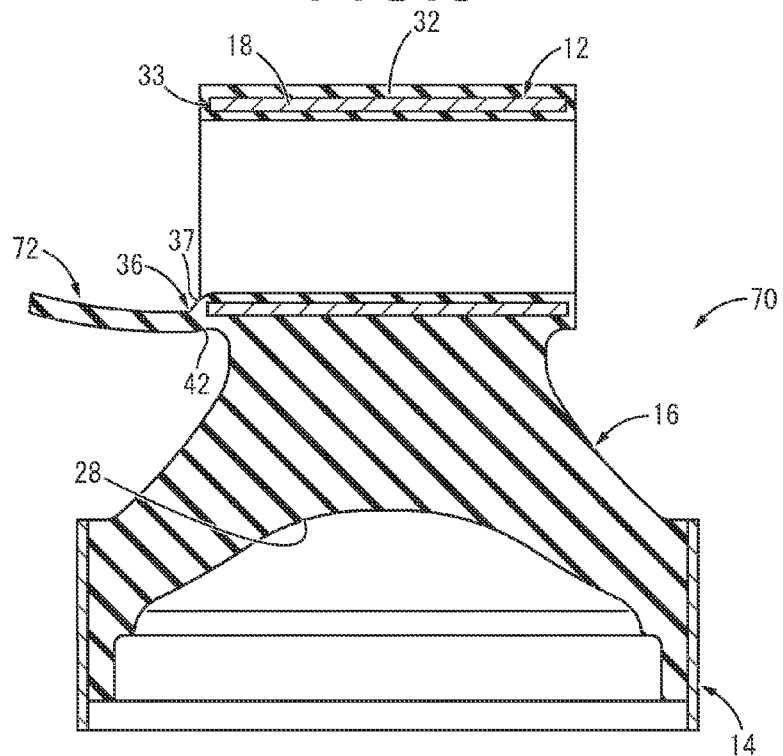
FIG. 8 is a vertical cross section view showing an engine mount as a third embodiment of the present invention.

FIG. 8 shows an engine mount 70 for an automobile as a third embodiment of the vibration damping device constituted according to the present invention. The engine mount 70 is equipped with a stopper rubber 72.

In more specific detail, the stopper rubber 72 has a plate shape that projects from the opening end part of the fitting tube part 18 with a roughly fixed width dimension, and is inclined gradually to the inner circumference side of the fitting tube part 18 as it goes to the projection tip end side. Furthermore, the stopper rubber 72 is an inclined part for which roughly the entirety is inclined in relation to the direction orthogonal to the mount center axis, and the incline angle in relation to the direction orthogonal to the mount center axis becomes gradually larger as it goes to the projection tip end side, and curves in the thickness direction. The stopper rubber 72 of this embodiment has a roughly fixed thickness, and the elastic major axis extending in the projection direction curves upward as it goes to the tip end side.

With the engine mount 70 having this kind of constitution as well, the same as with the first and second embodiments, the inner bracket 44 is attached to the first mounting member 12, and the outer bracket 46 is attached to the second mounting member 14. Also, in the state with the inner bracket 44 mounted on the first mounting member 12, the attachment part 50 of the inner bracket 44 is pressed against the stopper rubber 72, and the stopper rubber 72 is made to be elastically deformed in a roughly flat plate shape that is not inclined, extending roughly orthogonally to the mount center axis. By so doing, the stopper rubber 72 is abutted in an urged state on the inner bracket 44, and the occurrence of noise due to striking of the stopper rubber 72 on the inner bracket 44 and the like is prevented.

With this embodiment, the incline angle of the stopper rubber 72 changes gradually in the projecting direction, and the incline angle of the tip end side is larger than that of the base end side. By so doing, the stopper rubber 72 is pressed against the inner bracket 44 side in an urged state across roughly the entirety in the projecting direction, so it becomes even easier to hold the stopper rubber 72 in an abutted state on the inner bracket 44, and noise is prevented effectively. In particular, even at the tip end side of the stopper rubber 72 which easily separates from the inner bracket 44, the urging force based on the elasticity of the stopper rubber 72 is exhibited effectively. Thus, the stopper rubber 72 is more stably held in a state abutting the inner bracket 44, and noise is advantageously prevented.

Above, we gave a detailed description of embodiments of the present invention, but the present invention is not limited to those specific notations. For example, by providing dents and bumps, waveforms or the like partly on the surface of the stopper rubber, it is possible to improve the buffering action with the bound stopper.

Furthermore, the thickness of the stopper rubber can also change in the projecting direction gradually or in stages, and also partially, and the top surface and bottom surface of the stopper rubber do not absolutely have to extend at the same incline angle as each other. In specific terms, for example, by having the stopper rubber become gradually thicker walled as it goes to the base end side, it is possible to have the stopper rubber pressed against the inner bracket with greater urging force using the elasticity of the base end part of the stopper rubber.

Also, for example, it is possible to use a constitution whereby the stopper rubber extends with an incline in the direction roughly orthogonal to the mount center axis or to the outer circumference side of the fitting tube part as it goes to the projection tip end side, and the abutting surface against the stopper rubber with the inner bracket is an inclined surface that inclines downward in relation to the direction orthogonal to the mount center axis as it goes to the projection tip end side of the stopper rubber. In this case, by mounting the inner bracket on the first mounting member, the tip end side of the stopper rubber abuts the inner bracket and is pressed downward, so the stopper rubber abuts the inner bracket in an urged state and is overlapped. In other words, the stopper rubber is not necessarily limited to a shape with which it is inclined to the inner circumference side of the fitting tube part, and as long as the stopper rubber abuts the inner bracket, which is mounted on the first mounting member, in an urged state, any form can be used.

Also, the top surface of the stopper rubber can be roughly the same planar surface in relation to the surface of the covering rubber that covers the lower wall part top surface of the fitting tube part, or can extend so as to be positioned above that, and can be set freely according to the inner bracket form.

Also, the stopper rubber and the covering rubber can be formed as separate units from the main rubber elastic body. Furthermore, the stopper rubber is not necessarily limited to being an item formed of a rubber only as shown with the embodiments noted above, and for example it is also possible to have an elastic member formed from metal, resin, or rubber of a different elasticity or the like be adhered to the interior or the surface. In this case, in a state with the inner bracket mounted on the first mounting member, in addition to the urging force by the elasticity of the stopper rubber itself, by the urging force by the elasticity of the elastic member acting, abutting of the stopper rubber on the inner bracket in an urged state is more advantageously realized.

Also, with the preceding embodiments, as an example of the vibration damping device of the present invention, a so-called solid type engine mount was shown, but for example it is also possible to apply the present invention to a fluid-filled vibration damping device that includes a fluid chamber inside of which non-compressible fluid is sealed, and uses the vibration damping effect based on the fluid flow action or the like, as well as to a fluid-filled vibration damping device of an active type or characteristic switching type which are one type of fluid-filled vibration damping devices, or the like.

The application range of the present invention is not limited to an engine mount, and can also be applied to a sub frame mount, a body mount, a differential mount or the like, for example. Furthermore, the present invention is not an item applied only to the vibration damping device of an automobile, but can also be suitably applied to vibration damping devices used with motorcycles, railroad cars, industrial vehicles or the like.

What is claimed is:

1. A vibration damping device comprising:
   a first mounting member including a fitting tube part opening to a side for fitting and mounting of an inner bracket;
   a second mounting member;
   a main rubber elastic body elastically connecting the first and second mounting members; and
   a stopper rubber provided on a portion of a circumference of the fitting tube part while projecting to the side from an opening end surface of the fitting tube part, the stopper rubber being configured to overlap the inner bracket, wherein
   the stopper rubber is configured to be elastically deformed by fitting and mounting of the inner bracket into the fitting tube part so as to abut and overlap the inner bracket in a state urged by an elasticity of the stopper rubber itself, and
   an overlapping surface of the stopper rubber to overlap the inner bracket is inclined relative to an overlapping surface of the inner bracket to overlap the stopper rubber.

2. The vibration damping device according to claim 1, wherein the stopper rubber is inclined to an inner circumference side of the fitting tube part as it goes to a projection tip end side of the stopper rubber.

3. The vibration damping device according to claim 2, wherein an incline angle of an inclined part of the stopper rubber to the inner circumference side of the fitting tube part is fixed.

4. The vibration damping device according to claim 2, wherein an incline angle of an inclined part of the stopper rubber to the inner circumference side of the fitting tube part becomes larger as it goes to the projection tip end side.

5. The vibration damping device according to claim 1, wherein the stopper rubber has a plate shape that extends in a circumference direction of the fitting tube part.

6. The vibration damping device according to claim 1, wherein
   the first mounting member is arranged at one opening side of the second mounting member having a tube shape, and
   a bound stopper is constituted that restricts relative approaching displacement volume of the first mounting member and the second mounting member by abutting of the inner bracket fit in the fitting tube part of the first mounting member and a second mounting member side via the stopper rubber.

7. A vibration damping device comprising:
   a first mounting member including a fitting tube part opening to a side for fitting and mounting of an inner bracket;
   a second mounting member;

a main rubber elastic body elastically connecting the first and second mounting members; and a stopper rubber provided on a portion of a circumference of the fitting tube part while projecting to the side from an opening end surface of the fitting tube part, the stopper rubber being configured to overlap the inner bracket, wherein the stopper rubber is configured to be elastically deformed by fitting and mounting of the inner bracket into the fitting tube part so as to abut and overlap the inner bracket in a state urged by an elasticity of the stopper rubber itself, and the stopper rubber includes support recesses formed on both widthwise end parts of its projection base end part while opening to an outer circumference side of the fitting tube part, and the fitting tube part is exposed to the outer circumference side at the support recesses.

8. A vibration damping device comprising:

a first mounting member including a fitting tube part opening to a side for fitting and mounting of an inner bracket;

a second mounting member;

a main rubber elastic body elastically connecting the first and second mounting members; and a stopper rubber provided on a portion of a circumference of the fitting tube part while projecting to the side from an opening end surface of the fitting tube part, the stopper rubber being configured to overlap the inner bracket, wherein the stopper rubber is configured to be elastically deformed by fitting and mounting of the inner bracket into the fitting tube part so as to abut and overlap the inner bracket in a state urged by an elasticity of the stopper rubber itself, the fitting tube part is covered by a covering rubber including an end surface covering part that covers an axially end surface of the fitting tube part, the stopper rubber is integrally formed with the end surface covering part and projects axially outward therefrom, an overlapping surface of the stopper rubber to overlap the inner bracket includes a base end edge, the base end edge being positioned on the axially end surface of the fitting tube part, the end surface covering part further to the inner circumference side than the base end edge includes an inclined end surface inclined axially inward facing the inner circumference side, and the inclined end surface is configured to be pressed by the inner bracket in a fitting direction.

9. A vibration damping device comprising:

a first mounting member including a fitting tube part opening to a side for fitting and mounting of an inner bracket;

a second mounting member;

a main rubber elastic body elastically connecting the first and second mounting members; and a stopper rubber provided on a portion of a circumference of the fitting tube part while projecting to the side from an opening end surface of the fitting tube part, the stopper rubber being configured to overlap the inner bracket, wherein the stopper rubber is configured to be elastically deformed by fitting and mounting of the inner bracket into the fitting tube part so as to abut and overlap the inner bracket in a state urged by an elasticity of the stopper rubber itself, the stopper rubber is integrally formed with the main rubber elastic body, the stopper rubber includes a deformation allowance groove formed at its projection base end part, the deformation allowance groove extending in a width direction while opening onto a surface reverse to an overlapping surface to overlap the inner bracket, a groove internal surface of the deformation allowance groove has a smooth curved shape in a groove width direction, and an opening part of the deformation allowance groove is smoothly continuous with each surface of the stopper rubber and the main rubber elastic body.

* * * * *